Figure 1:
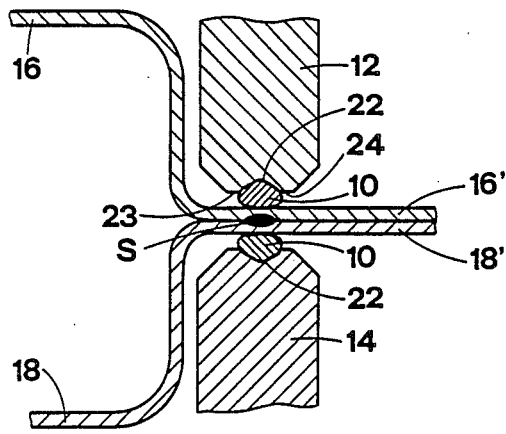

United States Patent [19]

Urech

[11] Patent Number: 4,886,953
[45] Date of Patent: Dec. 12, 1989

[54] ELECTRODE WIRE FOR A ROLLER SEAM WELDING MACHINE

[75] Inventor: Werner Urech, Kaiserstuhl, Switzerland

[73] Assignee: Elpatronic AG, Zug, Switzerland

[21] Appl. No.: 197,453

[22] Filed: May 23, 1988

[30] Foreign Application Priority Data

Jun. 22, 1987 [CH] Switzerland .................. 02346/87

[51] Int. Cl.⁴ .............................................. B23K 1/16
[52] U.S. Cl. ......................................... 219/64; 219/81
[58] Field of Search ........................... 219/64, 81, 82; 428/397; 174/133 R

[56] References Cited

U.S. PATENT DOCUMENTS 1,635,541  7/1927  Conrad ........................... 174/133 R
2,060,859  10/1933  Flynt ............................. 174/133 R

*Primary Examiner*—Bruce A. Reynolds
*Assistant Examiner*—Lincoln Donovan
*Attorney, Agent, or Firm*—McCormick, Paulding & Huber

[57] ABSTRACT

What is described is an electrode wire (20) which, in contrast to conventional electrode wire (10), is provided with flanges (30,31) formed on it to support it on the circumference of a roller electrode (12) at both sides of a guide groove (22,22'). The electrode wire (20) is broader than its contrast area on the work being welded and has a considerably broader contact area on the work being welded than the conventional electrode wire. As a result, metal sheets (for example lead-coated metal sheets of fuel tanks) are pressed together alongside the weld nugget as a result of which gaping apart of the sheets alongside the weld nugget and lateral tearing of the weld nugget are prevented. The profile of the electrode wire (20) projecting beyond the guide groove (22,22') is very thin and cannot be deformed laterally under transverse forces even if the electrode wire becomes soft during the welding. Welds produced with the electrode wire (20) have a considerably better fatigue strength than welds produced with the conventional electrode wire (10).

9 Claims, 2 Drawing Sheets

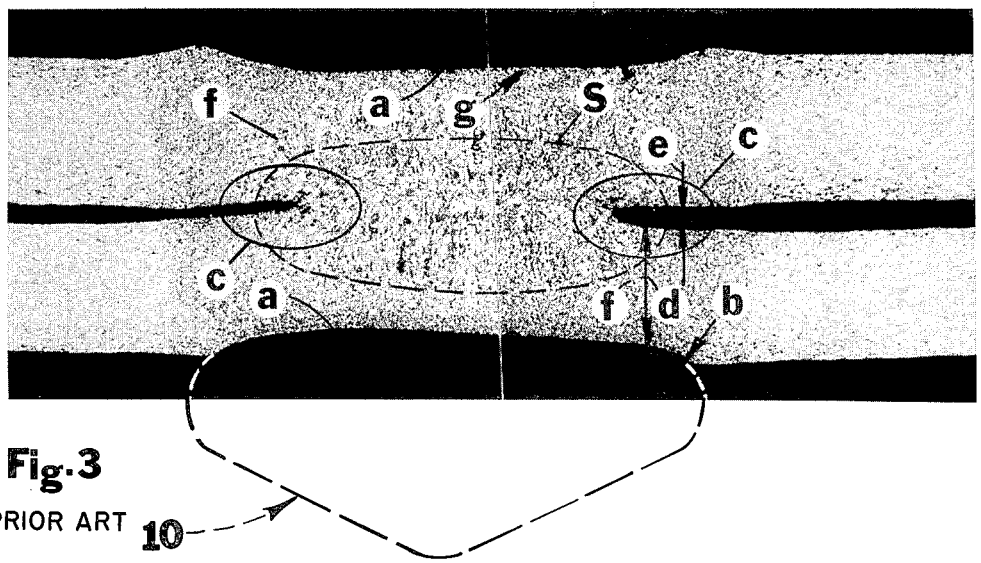
Fig.3
PRIOR ART  10
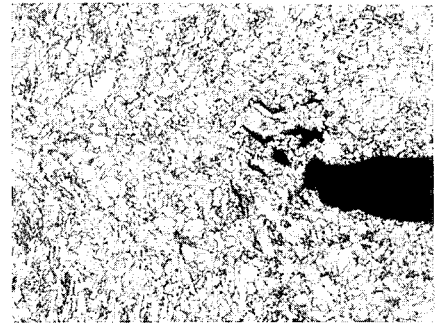
Fig.4
PRIOR ART
Fig.5
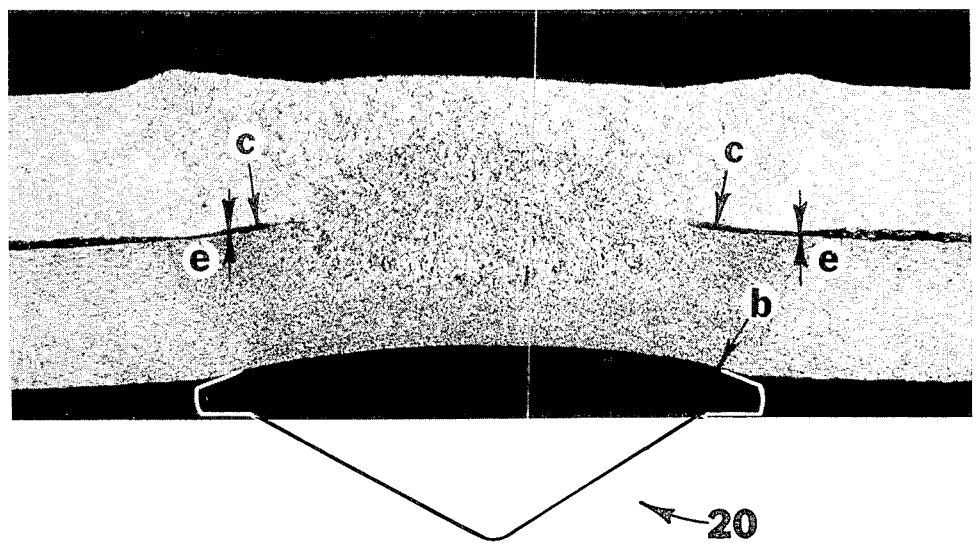
20

ELECTRODE WIRE FOR A ROLLER SEAM WELDING MACHINE

The invention relates to an electrode wire for a roller seam welding machine having at least one roller electrode and a guide groove provided in its circumference to receive the electrode wire of which the front face, which is to face the work to be welded, is substantially flat, rounded or V-shaped in cross-section and of which the back, which is to be received in the guide groove in the roller electrode, is preferably V-shaped or round in cross-section.

Roller seam welding machines in which electrode wire is used are known (CH-A-370 175 and DE-B-15 65 803). In these cases it is a question of resistance roller seam welding machines in which the electrode wire, usually consisting of copper, prevents the roller electrodes, which usually consist of a copper alloy, from being contaminated by the metal sheets coated with tin, zinc, lead etc. Otherwise, during resistance welding of metal sheets provided with such coatings, the roller electrodes would enter into alloys with the coating material of the work to be welded, under the action of the welding temperatures and of the pressing pressures, and be contaminated as a result. As a result of this alloy formation, the welding parameters, particularly the characteristic values of the material of the roller electrodes which influence the passage or transfer of current and heat, would be altered and the formation of the weld structure would be impaired as a result. This problem is eliminated by the electrode wire used between the work being welded and the roller electrode, which wire is continuously supplied afresh to the welding position. The electrode wire alloys with the coating material of the sheet metal, which material becomes molten shortly before or during the welding, and, as a result, prevents the coating material which is released from combining with the roller electrodes and so making these unusable. The wire contaminated by the welding operation is continuously conveyed away. The electrode wire is unwound from a delivery spool and, after passing through the welding position, is wound up on a take-up spool or comminuted in order to be melted down later.

The electrode wire used in such roller seam welding machines usually has such a cross-section that the contact area between the wire and the roller electrode is larger than with a normal round wire, in order to achieve a better passage of current and less heating. An electrode wire of the type mentioned at the beginning is known (DE-C1-35 26 648) for the resistance roller seam welding of sheets provided with a coating, particularly steel sheets with coatings which are poor electrical conductors or non-conducting or with severe contamination. One development of this known electrode wire is a so-called tri-elliptic wire which is V-shaped in cross-section at the back and rounded or flat and additionally grooved at the front. As a result of this grooving, the coatings adhering to the sheet metal which are electrically poor conductors or non-conducting and which are softened by the approach of heat, are pierced or displaced. As a result, the roller electrode is prevented from floating on the coating, for example a coat of paint. The term electrode wire used in the following description and in the patent claims is intended to include both electrode wire grooved on the front and electrode wire ungrooved on the front.

Figure 2:
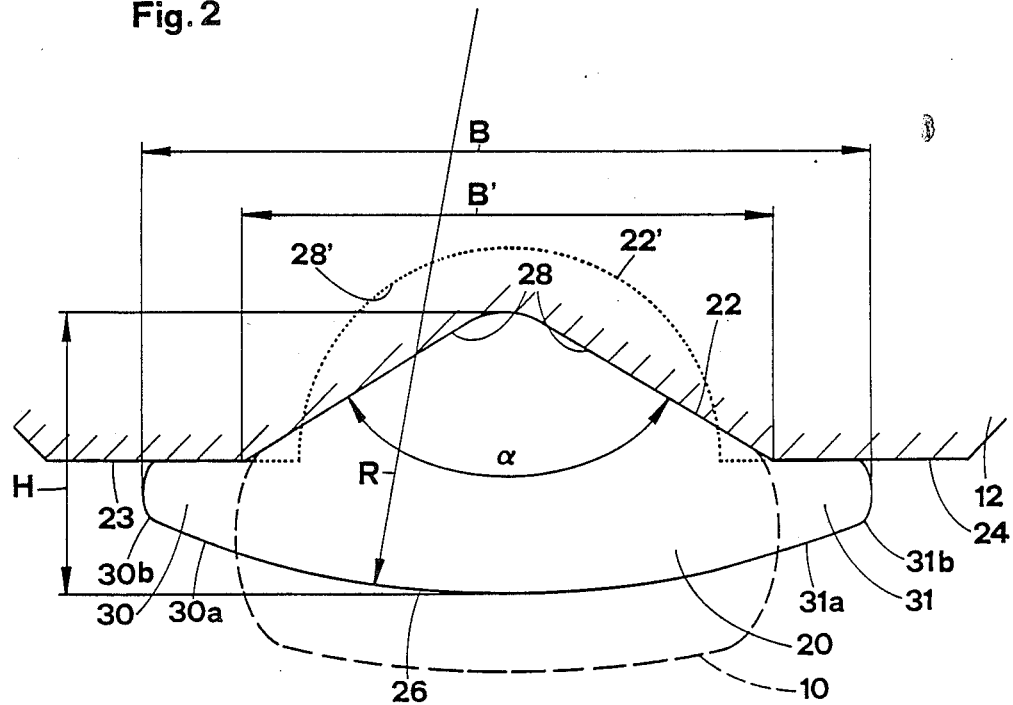

Tri-elliptic electrode wire, as illustrated in broken lines in a cross-sectional view in FIG. 2, has proved very satisfactory particularly for the welding of motor vehicle tanks with electrolytic lead coating, relatively broad welding flanges, welding flanges without appreciable draw wrinkles and parallel welding flanges. There are, however, critical cases in which the welding can become problematical, for example in the cases of hot-leaded sheets, of narrow welding flanges, of welding flanges with draw wrinkles, of non-parallel welding flanges, particularly if these open towards the inside of the tank, and of large transition radii running into the tank flange.

The reasons for the possible problems in such critical cases are:

hot-leading is generally thicker and more irregular in layer thickness than electrolytic lead coating. It requires higher welding currents which lead to greater heating of the sheet metal and of the electrode wire and to deep impressions of the wire in the sheet metal. Narrow welding flanges of the tanks lead to an accumulation of heat between the welding seam and the edge of the sheet as a result of the approach of heat. Thus the margin softens and yields laterally. The wire is then only supported at one side. It is deformed to one side and has a tendency to run off, that is to say it behaves like a badly pumped-up bicycle tyre (so-called "bicycle-tyre effect"). Draw wrinkles in the sheet metal have to be smoothed by the welding force via the electrode wire during the welding. This requires a greater welding force than is necessary for the welding. The resulting welding force between the sheets fluctuates, that is to say it is reduced at the places where deformation work has to be performed. The welding becomes irregular. The greater welding force also requires more welding current and causes greater heating and deformation of the electrode wire as well as deeper impressions in the sheet metal. Non-parallel welding flanges of the tanks likewise have to be pressed together by the roller electrodes. As a result, the sheet metal is stressed in shear beside the seam. Large transition radii running into the tank flanges have the same influence as non-parallel tank flanges.

How these all add up and can make the welding problematical in extreme cases is explained in more detail below with reference to FIGS. 3 and 4.

FIG. 3 shows a weld which has been produced with conventional tri-elliptic electrode wire as shown in FIG. 1 on the flanges of a tank of lead-coated sheet. It can easily be seen that the weld nugget S obtained is not the ideal weld nugget and that (a) the outer surfaces of the sheet exhibit deep impressions from the wire, at the longitudinal edges of which the edge impressions (b) of the electrode wire can clearly be seen (compare the tri-elliptic electrode wire which is shown in broken lines in FIG. 3 and which has been used for the welding), (c) the weld nugget S is torn into from the side (detail see FIG. 4), (d) there are weak places in the sheet metal which are considerably thinner than the thickness of the sheet (hinge-forming), (e) the sheets already gape apart directly beside the weld nugget S, (f) shearing cracks (only detectable with greater enlargement) appear in the sheet in regions beside the weld nugget S and (g) surface cracks are caused as a result of transverse loading of the sheet by the flattening wire. Prolonged fatigue tests have shown that tanks with welds as shown in FIGS. 3 and 4 began to leak already after 30–70% of the required number of reversals of stress, that is to say they were too little resistant to fatigue.

It is the object of the invention to develop an electrode wire of the type mentioned at the beginning so that, with it, considerably better welding results and more fatigue-proof welds can be achieved in critical cases such as those described above than with conventional tri-elliptic electrode wire.

In order to solve this problem, the electrode wire according to the invention is characterised by two flanges additionally formed on it in the longitudinal direction of the wire in the transition region between the front and the back, in order to support the electrode wire on the circumference of the roller electrode at both sides of the guide groove.

As a result of the flanges additionally formed on it at its two longitudinal sides, the electrode wire according to the invention has a considerably greater contact area with the roller electrode than the conventional electrode wire. The profile of the electrode wire according to the invention which projects beyond the guide groove is very thin and even if the wire becomes soft during the welding it cannot be deformed laterally under transverse forces so that the bicycle-tyre effect does not occur. As a result of the larger contact area, the electrode wire according to the invention is also better cooled than conventional electrode wire. In addition, the specific current load at the transition roller/wire is considerably less. As a result of the considerably broader contact area of the electrode wire according to the invention on the sheet metal, this is also compressed alongside the weld nugget. The gaping of the sheets beside the weld nugget and hence also the lateral tearing of the weld nugget is prevented.

It is true that the above-mentioned problems, which might occur when using conventional tri-elliptic electrode wire during roller seam welding, would not normally occur during conventional roller seam welding without electrode wire, but such conventional roller seam welding without electrode wire would not be advantageous in the cases here in question such as lead-coated sheet for example, for the reasons explained at the beginning. The adaptation of the profile shape of the electrode wire to the shape of a conventional roller electrode, effected according to the invention, has led to the result that the welding quality is at least equally good as that of a conventional weld without electrode wire and that the welding reliability and the economy are considerably increased by the advantages which the use of the electrode wire leads to (uniform welding parameters, narrow welding seam, little introduction of heat, high welding speed, absence of external cooling).

Advantageous developments of the invention form the subject of the sub-claims. According to these developments, the electrode wire according to the invention is wider in profile than its contact area on the surface of the sheet. The edges of the electrode wire according to the invention, that is to say the outer longitudinal edges of its flanges do not touch the surface of the sheet. The edge impressions on the sheet, known from conventional forms of electrode wire are therefore not present after the welding. The contact area between the roller electrode and the electrode wire is increased by 30 to 50% and preferably by about 40%, which leads to the correspondingly better cooling and lower specific current load.

Examples of embodiment of the invention are described in more detail below with reference to the drawings.

FIG. 1 shows, as part of a roller seam welding machine, the roller electrodes with conventional electrode wire during the welding together of metal sheets to form a fuel tank, FIG. 2 shows a partial cross-sectional view of a roller electrode with the electrode wire according to the invention, a conventional electrode wire being indicated in broken lines for comparison, FIG. 3 shows a micrograph of a weld produced with conventional electrode wire according to FIG. 1, FIG. 4 shows an enlarged illustration of one of the regions designated by c in FIG. 3, and FIG. 5 shows a micrograph of a weld produced with the electrode wire according to the invention on the same sheet as in FIG. 2.

FIG. 1 shows a portion of a resistance roller seam welding machine with conventional electrode wire 10 (DE-C1-35 26 648) of which only an upper roller electrode 12 and a lower roller electrode 14 are illustrated. In the example illustrated, a fuel tank is being welded from sheets 16,18. The electrode wire 10 is between each roller electrode and the sheet. The conventional electrode wire 10 illustrated is so-called tri-elliptic electrode wire. In contrast to this, the electrode wire 20 according to the invention has a broader and flatter profile as can easily be seen from FIG. 2 in which, apart from the electrode wire 20 illustrated in full lines, the conventional electrode wire 10 is also indicated in broken lines for comparison purposes. FIG. 2 will be gone into in more detail below. If welding is effected with the electrode wire 20 instead of with the electrode wire 10, such an electrode wire 20 is supplied to the upper roller electrode 12 and a further electrode wire 20 is supplied to the lower roller electrode 14. The roller electrodes 12,14 are each provided, at their circumference, with a guide groove 22 which is V-shaped as a whole in cross-section. The two circumferential areas 23,24 adjacent to the guide groove 22 are each plane in cross-section. Formed on the metal sheets 16,18 are flanges 16',18' which are welded to one another between the roller electrodes 12,14.

As mentioned, FIG. 2 shows the electrode wire 20 according to the invention in full lines and the conventional electrode wire 10 in broken lines. The vertex angle $\alpha$ of the guide groove 22, which is the same as the vertex angle of the part of the electrode wire 20 received in the guide groove 22, is 120° in the example shown in FIG. 2. The electrode wire illustrated is substantially rounded at its front 26 which is to face the work being welded whereas its back 28, which is received in the guide groove 22, is substantially V-shaped as mentioned. An electrode wire could also easily be used which has the rounded shape illustrated in full lines at its front 26 but a round shape received in a round guide groove 22' at its back 28' as indicated in dotted lines in FIG. 2. As likewise mentioned already, the electrode wire 20 is intended for a single run through between a roller electrode and the work being welded.

The electrode wire 20 is provided, in its transition region between the front 26 and the back 28, with flanges 30,31 which are formed on it and which serve to support the electrode wire 20 on the circumferential areas 23 and 24 respectively of the roller electrode, at both sides of the guide groove 22. Both the wire 10 and the wire 20 are produced from round wire, for which purpose a profiling unit is used which is provided on the roller seam welding machine or outside it. The round starting wire for the electrode wire 10 has a diameter of 2.2 mm in the example described here and during the profiling experiences an elongation of about 12%. The round starting wire of the electrode wire 20, on the other hand, has a diameter of 2.5 mm and experiences an elongation of about 25-60% and preferably of 35% during the profiling. If the area of the back 28, with which the wire 10 comes into contact with the roller electrode 12 in the guide groove 22, is taken as 100%, the contact area between the electrode wire 20 and the electrode roller 12 is 140% since the electrode wire 20 is additionally in contact with the electrode roller 12 by the back of its flanges 30 and 31. It can easily be seen from FIG. 2 that the back 28,28' of the electrode wire 20, which is received in the guide groove 22,22', bends at an angle into the back of the flanges 30,31 and that the whole of the front 26, including the front 30a,31a of the flanges 30,31 is rounded, that is to say it has a common radius of curvature R.

FIG. 5 shows a micrograph of a weld which has been produced on a fuel tank with the electrode wire 20 shown in FIG. 2. In comparison with the weld with conventional tri-elliptic electrode wire shown in FIG. 3, it can be seen in FIG. 5 that at (b) the longitudinal edge of the electrode wire 20 is not in contact with the metal sheet as a result of which there is a more gentle transition and the disadvantageous impressions of the edges of the wire are avoided, that at (c) the weld nugget is not torn into and that at (e) the sheets do not gape apart alongside the weld nugget.

The fatigue tests already briefly mentioned above have shown too little fatigue strength in a weld as shown in FIG. 3 which has been produced with conventional tri-elliptic electrode wire. The tanks thus welded began to leak already in the test after 30 to 70% of the required number of alternating stresses. The weld shown in FIG. 5 with the electrode wire 20 according to the invention, on the other hand, showed in the test that the fatigue strength of the tanks could be increased considerably since these tanks were still fluid-tight after five times the required number of alternating stresses, when the test was ended.

According to FIG. 2, the flanges 30,31 each have an outer longitudinal edge 30b or 31b respectively. The radius of curvature R is selected so that even during the welding, the outer longitudinal edges 30b,31b of the flanges 30,31 do not touch the surface of the work being welded. As mentioned, this can be seen in FIG. 5. It should be noted that the illustration in FIGS. 2 and 5 show the electrode wire 20 greatly enlarged in cross-section. In an example of embodiment, the dimension B in FIG. 2 is, in reality, about 3.5 mm, the dimension B' about 2.6 mm and the dimension H about 1.3 mm.

It is true that only a rounded cross-sectional shape of the front of the electrode wire 20 is illustrated in the drawings but its front could also have the plane cross-sectional shapes 1 to 3 illustrated in FIG. 6b in DE-C1-35 26 648 or the V-shaped cross-sectional shape 5 (grooved or ungrooved in each case).

I claim:

1. In a roller seam welding machine having at least one electrode wire and one roller electrode with a guide groove (22) provided in its circumference to receive the electrode wire (20), the electrode wire having a front (26) which faces the work being welded (16') and which is of selected shape, for example substantially flat, rounded or V-shaped, the wire also having a back (28,28') which is received in the guide groove (22,22') of the roller electrode (12) and which is also selectively shaped, preferably V-shaped or round in cross-section, the improvement characterized in that the electrode wire has two flanges (30, 31) formed thereon in the longitudinal direction of the wire and located in the transition region between the front and the back (26,28,28') to support the electrode wire (20) on the circumference of the roller electrode (12) at both sides of the guide groove (22,22').

2. The improvement of claim 1, characterized in that the contact area between the roller electrode (12) and the flanges (30,31) amounts to 30-50% of the contact area between the roller electrode (12) and the back (28,28') received in the guide groove (22,22').

3. The improvement of claim 1, characterized in that the contact area between the roller electrode (12) and the flanges (30,31) amounts to 40% of the contact area between the roller electrode (12) and the back (28,28') received in the guide groove (22,22').

4. The improvement of claim 1 wherein the front (26) of the electrode wire facing the work to be welded (16') is rounded and the back (28,28') which is received in the guide groove (22,22') joins the back of the flanges (30,31) of the electrode wire (20) at an angle.

5. The improvement of claim 1 characterized in that the front (26) of the electrode wire including the front (401,31a) of the flanges (30,31) has a common radius of curvature (R).

6. The improvement according to claim 5, characterized in that the common radius of curvature (R) is selected so that the outer longitudinal edges (30b, 31b) of the flanges (30,31) do not touch the surface of the work being welded (16') even during the welding.

7. An electrode wire for use in a roller seam welding machine having at least one roller electrode (12) with a guide groove (22) provided in its circumference to receive the electrode wire (20), said electrode wire comprising: a front side (26) which in the central region contacts the work being welded (16') and has a predetermined profile, for example substantially flat, rounded or V-shaped; a back side (28, 28') which is received in the guide groove (22, 22') of the roller electrode (12) and has a predetermined profile, preferably V-shaped or round; and two oppositely disposed flanges (30, 31) respectively extending in the longitudinal direction of the wire and positioned in the transition region between the front side and the back side (26,28,28') of the electrode wire to support the electrode wire (20) on the circumference of the roller electrode (12) at both sides of the guide groove (22,22').

8. An electrode wire according to claim 7, in which the portion of the back side received in the guide groove connects at an angle with each of the flanges.

9. Electrode wire according to claim 7, characterized in that the front side including the front of the flanges has a common radius of curvature (R).

* * * * *